(12) United States Patent
Zade et al.

(10) Patent No.: US 11,379,522 B2
(45) Date of Patent: Jul. 5, 2022

(54) CONTEXT PRESERVATION

(71) Applicant: Cisco Technology, Inc., San Jose, CA (US)

(72) Inventors: Akshay Sachin Zade, Nagpur (IN); Dineshkumar Jayakumar, Milpitas, CA (US); Sourav Chakraborty, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 31 days.

(21) Appl. No.: 16/800,986

(22) Filed: Feb. 25, 2020

(65) Prior Publication Data
US 2021/0263968 A1    Aug. 26, 2021

(51) Int. Cl.
| | |
|---|---|
| *G06F 16/901* | (2019.01) |
| *G06F 16/9038* | (2019.01) |
| *G06F 16/904* | (2019.01) |
| *G06F 16/23* | (2019.01) |
| *H04L 51/00* | (2022.01) |
| *G06F 40/30* | (2020.01) |
| *G06F 3/0481* | (2022.01) |
| *H04L 51/02* | (2022.01) |
| *H04L 41/22* | (2022.01) |
| *G06Q 30/00* | (2012.01) |

(52) U.S. Cl.
CPC .......... *G06F 16/901* (2019.01); *G06F 3/0481* (2013.01); *G06F 16/2365* (2019.01); *G06F 16/904* (2019.01); *G06F 16/9038* (2019.01); *G06F 40/30* (2020.01); *G06Q 30/016* (2013.01); *H04L 41/22* (2013.01); *H04L 51/02* (2013.01); *H04L 51/16* (2013.01)

(58) Field of Classification Search
CPC .. G06F 16/901; G06F 16/9038; G06F 16/904; G06F 16/2365; G06F 40/30; G06F 3/0481; G06Q 30/016; H04L 41/22; H04L 51/02; H04L 51/16
See application file for complete search history.

(56) References Cited

U.S. PATENT DOCUMENTS

| | | | |
|---|---|---|---|
| 8,407,158 B2 | 3/2013 | Suri et al. | |
| 8,990,775 B2 | 3/2015 | Bates | |
| 2008/0055269 A1* | 3/2008 | Lemay | G06F 3/017 |
| | | | 345/173 |
| 2018/0121808 A1* | 5/2018 | Ramakrishna | G06F 11/0793 |

(Continued)

*Primary Examiner* — Seth A Silverman
(74) *Attorney, Agent, or Firm* — Lee & Hayes, P.C.

(57) ABSTRACT

This disclosure describes techniques for performing context preservation related to a conversational user interface of a first user device. The techniques include receiving an inquiry regarding an operational status of a computing resource network and based at least in part on the inquiry, generating a response to the inquiry for display in the conversational user interface. The techniques also include identifying supplemental data as being relevant to the support session, and causing the response to the inquiry and the supplemental data to be displayed concurrently. A data package may be created that represents the support session, including the inquiry, the response, the supplemental data, and an indication that the response and the supplemental data were displayed concurrently. The techniques may include exporting the data package to a second user device for presentation of the support session.

20 Claims, 10 Drawing Sheets

(56) References Cited

U.S. PATENT DOCUMENTS

| | | | |
|---|---|---|---|
| 2019/0018694 A1* | 1/2019 | Rhodes | G10L 15/18 |
| 2019/0050239 A1* | 2/2019 | Caldwell | G06F 11/079 |
| 2019/0196669 A1* | 6/2019 | Riera | G06F 3/04883 |
| 2019/0227910 A1 | 7/2019 | Raviv et al. | |

* cited by examiner

200

```
1  [
2    {
3      "sender": "admin",
4      "timestamp": 1571822087415,
5      "payload": {
6        "text": "How was the network doing yesterday in San Jose?"
7      }
8    },
9    {
10     "sender": "bot",
11     "timestamp": 1571822189986,
12     "context": {
13       "site_name": "San Jose",
14       "start_time":  1571682600000,  // Oct 22nd
15       "end_time":  1571769000000,  // Oct 23rd
16     },
17     "payload": {
18       "text": "There were intermittent issues.",
19       "widgets": [
20         "LineChart"
21       ],
22       "suggestions": [
23          "which clients had bad health scores"
24       ]
25     }
26   }
27 ]
```

FIG. 2

CONTEXT PRESERVATION

TECHNICAL FIELD

The present disclosure relates generally to context preservation for a conversational user interface, thereby expanding the functionality of applications.

BACKGROUND

Conversational user interfaces are used in a variety of applications. A conversational user interface may facilitate communication between human users and/or may be supported by a chat bot on at least one side of the conversation. In some cases, supplemental data may be presented to support and/or enhance the conversation. For example, a relevant chart may be shown alongside a text conversation, such as in a separate display area. Therefore, the conversation may be enriched by a context (e.g., the chart). The context may provide relevant meaning to the text portion of the conversation, and may change as the conversation evolves (e.g., the chart may change to a list, a graph, etc.). While the context is helpful for enriching a conversation, some or all of the context around the conversation is lost if the conversation is ended between human users and/or virtual agents.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIG. 2 illustrates an example data structure associated with context preservation techniques, in accordance with the present concepts.

DESCRIPTION OF EXAMPLE EMBODIMENTS

Overview

Figure 1A:
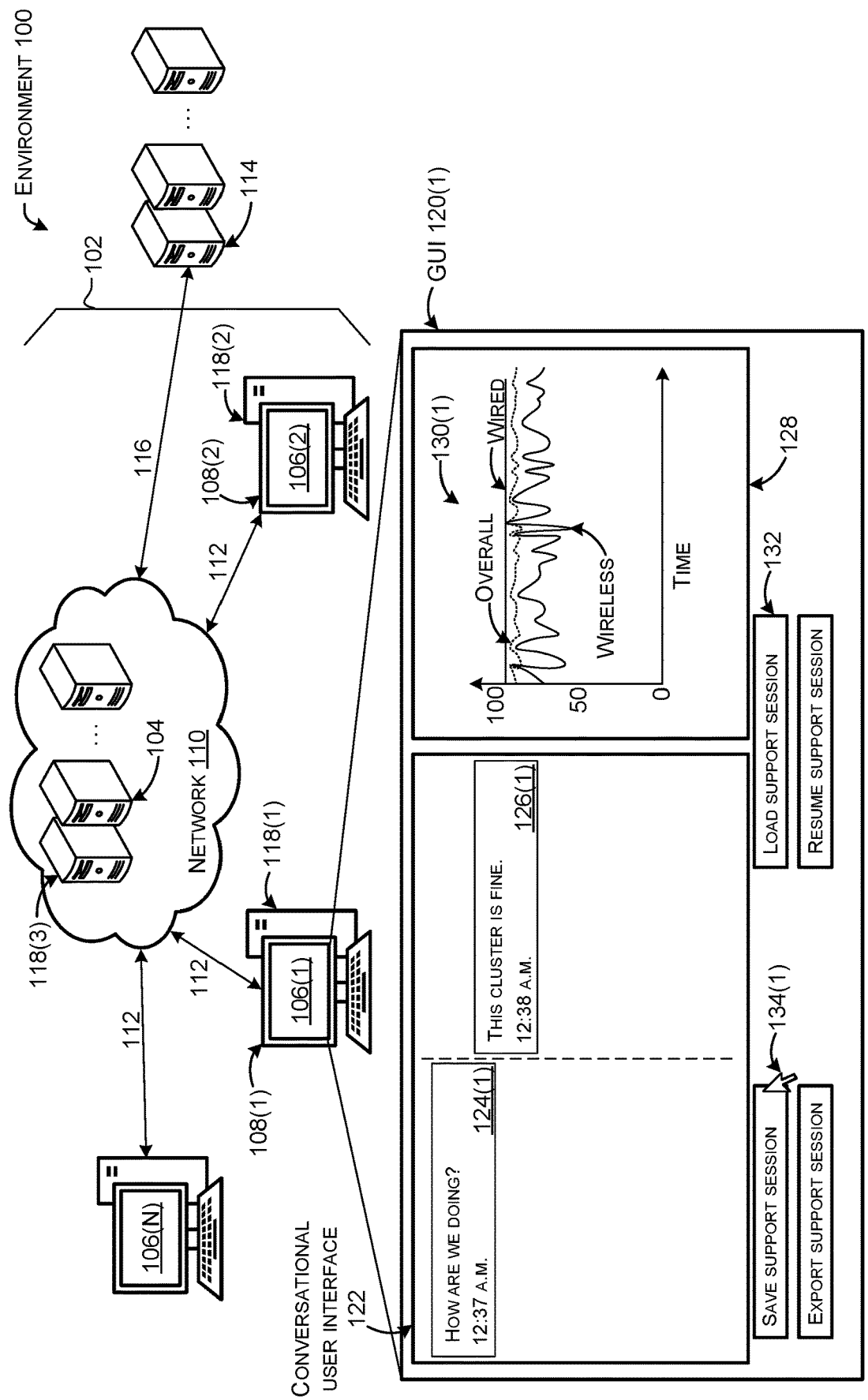
FIGS. 1A-1E illustrate component diagrams with an example scenario in which context preservation techniques may be employed in association with a conversational user interface, in accordance with the present concepts.

This disclosure describes a method that may be implemented by a server device communicatively coupled to a first user device and/or a second user device. The method may include initializing a support session between a user and a support agent associated with a computing resource network, the support session displayed via a conversational user interface of a display of the first user device. The method may include receiving, via the conversational user interface, an inquiry regarding an operational status of the computing resource network. Based at least in part on the inquiry, the method may include generating a response to the inquiry for display in the conversational user interface. Also based at least in part on the inquiry, the method may include identifying supplemental data as being relevant to the support session for the computing resource network. Further, the method may cause the response to the inquiry to be displayed via the conversational user interface on the display, and may cause the supplemental data to be displayed via the display concurrent with the response to the inquiry. The method may also include creating a data package representing the support session, including the inquiry, the response, the supplemental data, and an indication that the response and the supplemental data were displayed concurrently, and may include exporting the data package to a second user device for presentation of the support session.

This disclosure also describes a method that may be implemented by a user device, for example. The method may include receiving a data package representing a support session between a user and a virtual agent associated with a computing resource network. For instance, the data package may include a text portion and supplemental data of the support session and an indication that the text portion and the supplemental data were displayed concurrently during the support session. Using the data package, the method may include causing presentation of the support session via the display, including presentation of the text portion in a first section of the display. The method may further include receiving a selection of the text portion of the support session. Responsive to the selection, the method may include causing presentation of the supplemental data in a second section of the display concurrent with the presentation of the text portion in the first section of the display.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for preserving a context of a conversation in a conversational user interface. For example, a first user may have a conversation via a conversational user interface. The text of the conversation may be saved for recall by a second user at another time. In addition to text, the saved conversation may also include supplemental data that provides context for the conversation. For instance, the saved conversation may include a chart that was shown alongside (e.g., concurrent with) a particular portion of the text in the conservation. Later, the second user may be able to recall the saved conversation. The second user may be able to indicate (e.g., select) the particular portion of the text, and be shown the corresponding supplemental data in response. As such, the second user is able to view the conversation with the original context. Furthermore, the second user may be able to continue the conversation from a point where the first user ended the conversation. As such, context preservation techniques enable preservation of a conversation enriched with context. Context preservation techniques also allow recall and resumption of an enriched conversation by another user.

The usefulness and functionality of conversational user interfaces may be greatly expanded by being able to store, recall, and/or continue a conversation at a later time and/or by a different user. In particular, techniques that preserve the context alongside corresponding text portions of a conversation would be an improvement to conversational user interfaces. Typical conversational user interfaces may enable a way to record the text portion of a conversation. However, while the text of the conversation may be recalled, the supplemental data accompanying the conversation may not be stored in a way that allows a new user to rewind to a particular time in the conversation, and review the context that was presented at that time. Thus, a relevant aspect of the conversation may be missing. In other words, even though a conversation may be reviewed at a later time, the context of the conversation may be lost. The success of retracing a conversation would be improved by being able to recall the context along with the text of the conversation. Another typical mechanism of conversation sharing for conversational user interfaces involves a user manually taking multiple screen shots during a conversation, and saving or sharing the images in some fashion. However, manually taking screen shots is inefficient, time consuming, and may be prone to mistakes. Additionally, hunting through multiple images for a context for a conversation is cumbersome at best, and does not facilitate resuming the conversation. In contrast, the context preservation techniques described herein may be viewed as context-aware time travel for a conversation. Stated another way, a conversation from a previous time may be picked up at a later time seamlessly, retaining the context from the previous time.

In this application, purposes of a conversation via a conversational user interface may include customer service, technical support sessions, and/or any interaction with a conversational user interface in which supplemental data may be presented. For instance, a customer may log on to a website of a company for customer service, seeking some information or assistance. The customer may be presented with a conversational user interface to interact with a human customer service agent and/or a virtual customer service agent (e.g., chat bot). The customer may ask questions, select options, and otherwise converse via the conversational user interface. The display may include a first section in which text of the conversation is displayed, and may include a second section in which supplemental data are displayed. In some cases, the supplemental data may represent attempts by the human or virtual customer service agent to answer questions posed by the customer. In other cases, the supplemental data may be options presented to the customer in response to a text entry made by the customer. A wide variety of types of supplemental data is contemplated. Regardless, the company may wish to preserve the conversation, including the context.

In this example, the company may envision a variety of reasons for a conversation to be saved with the context. For example, the saved conversation may be used as a record of interaction with the customer, to review the performance of the human or virtual customer service agent, for training customer service agents, etc. Also, the company may wish to preserve the conversation with the context in case the customer service session is escalated to another customer service agent. In some examples, a virtual customer service agent may not have been able to provide the information or assistance sought by the customer, and the matter is escalated to a human customer service agent for more nuanced support of the customer. In other examples, a human customer service agent may not have resolved an issue, and a different customer service agent may need to continue the conversation. Also, the nature of the customer service may require multiple support sessions. For instance, the conversation may be suspended, and the customer may log back in to the conversational user interface at another time. The company may wish to resume the suspended conversation in a manner that picks up right where the conversation left off, to provide a better customer service experience, rather than requiring the customer to re-enter portions of the conversation. Context preservation techniques may include continuously saving the ongoing conversation in the background, without interrupting the conversation. Therefore, context preservation can enhance customer service by providing a relatively seamless experience for the customer.

Another example of context preservation is in the domain of a technical support session. For example, an engineer (technician, etc.) may access a conversational user interface to interact with a support agent. In some implementations, the support agent may be a chat bot. The chat bot may be associated with a system for which the engineer provides technical support. For instance, the system may be a computing network, and the engineer may initiate a support session with the chat bot via the conversational user interface in order to check a status of the computing network, to debug an issue with the computing network, etc. In some cases, the engineer may have been assigned a ticket relating to a particular issue with the computing network. The engineer may interact with the chat bot, periodically causing supplemental data to be presented alongside text in the conversational user interface. The supplemental data may include network data, operational data, user notes, interactive widgets, images, video, diagrams, charts, graphs, lists, and/or other types of data retrieved from the computing network in response to inquiries from the engineer. The supplemental data may also include other information, such as system metadata or other information, including a potentially changing state of the network or cloud deployment as the conversation proceeds. However, the issue may be more complex than the engineer is trained to resolve, and the issue may need to be escalated to another engineer for resolution. For a variety of reasons, debugging a network or operational issue often involves multiple support personnel and steps, spanning multiple support sessions and potentially multiple domains. For communication between different support personnel to be effective, the support personnel need to convey not only the conclusions drawn so far, but also the series of steps followed to arrive at the conclusions. Each of such steps may be associated with the different supplemental data suggested above. Further, it is advantageous for the next engineer to be able to efficiently review troubleshooting steps taken by the original engineer, without having to reconstruct or redo the work. Retracing steps is inefficient, delaying resolution of the issue and wasting resources, such as the engineer's time and potentially bandwidth consumed in repeatedly investigating the issue.

In some examples, context preservation techniques may be employed to capture the conversation of the original engineer such that the next engineer can smoothly pick up the conversation. For example, the conversation with the original engineer may be saved, with context, and associated with the ticket. The conversation and context may be continuously saved in the background as the conversation unfolds. Additionally or alternatively, the engineer may choose to save and/or export the conversation at any point in the conversation. The ticket may then be assigned to the next engineer, who may then access the saved, context-enriched conversation, to review the work of the original engineer and continue the conversation. With context preservation techniques the next engineer is therefore able to review the progression of steps taken by the original engineer, see the supplemental data that the original engineer accessed, potentially see where the original engineer went astray in his/her investigation of the issue, and/or generally not repeat efforts that were fruitless. In this manner, context preservation techniques can provide frictionless information sharing between different levels of support personnel to solve problems. Thus, use of context preservation techniques may significantly decrease redundancy in technical support and wasted network resources.

Context preservation techniques may be useful in the domain of technical support sessions for computing networks for the following reasons. Increasingly, the state of a computing network or cloud deployment may differ from session to session as the time between sessions increases. Access to supplemental data describing the state of the network at a time of a previous debugging attempt may be critical to an engineer trying to resolve a network issue. In some examples, retracing a debug history may involve gathering information from multiple systems. Having this information retained contemporaneously with the conversation would prevent a complex process of hunting for and/or reconstructing information which may no longer be available. Further, in the case of debugging attempts that produce failures such as crash dumps, or that include RCA output, the debug history may not be preserved. Unless the user maintains thorough documentation, this may lead to a loss of context between sessions. For these reasons, context preservation techniques that quietly preserve a self-contained bundle of the conversation with corresponding supplemental data would greatly improve technical support for computing networks.

Context preservation techniques may become even more useful as conversational user interfaces and/or chat bots become more sophisticated. Traditionally, chat bots have provided a relatively small, fixed set of conversation paths, which may be driven by pre-populated questions selected by a user. In contrast, new technologies (e.g., natural language processing) have allowed for more complex chat sessions, responding to almost any entry by a user. As conversations enabled by users approach natural human conversation flows and thought processes, ways to retain and review a conversation so that another user may pick up the conversation will require new technologies as well. Context preservation techniques offer seamless conversation recording and export to help keep pace with updated conversational user interfaces and/or chat bots.

Although the examples described herein may refer to a support session associated with a computing network, and/or a chat bot used in such a support session, the techniques can generally be applied to a conversation within a conversational user interface in a variety of scenarios. Further, the techniques are generally applicable in association with any network of devices managed by any entity where virtual resources are provisioned. In some instances, the techniques may be performed in cooperation with software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1E collectively illustrate an example environment 100 in accordance with the present context preservation concepts. Example environment 100 may include a system 102 including server devices 104 and/or user devices 106 (e.g., computing devices, mobile devices). In some cases, parentheticals are utilized after a reference number to distinguish like elements. Use of the reference number without the associated parenthetical is generic to the element. Accordingly, system 102 may include user device 106(1), user device 106(2), and any number "N" of additional devices, represented by user device 106(N). Also, user devices 106 may include displays 108 (e.g., monitors, display screens, etc.).

In example system 102, server devices 104 and user devices 106 may be communicatively coupled to various other devices via computing network 110. The server devices 104, user devices 106, and/or other devices may exchange communications (e.g., packets) via wired and/or wireless network connection(s) either directly or indirectly via computing network 110, indicated by double arrows 112. For instance, network connections 112 may be transport control protocol (TCP) network connections or any network connection (e.g., information-centric networking (ICN)) that enables exchange of packets among the server devices 104, user devices 106, and/or other devices. The network connections 112 may represent, for example, data paths among the server devices 104, user devices 106, and/or other devices. It should be appreciated that the term "network connection" may also be referred to as a "network path."

As shown in FIGS. 1A-1E, system 102 may also be connected to client devices 114. Client devices 114 may be connected to system 102 and/or to network 110 via a network connection 116. Network connection 116 may be similar to network connections 112 described above, and may represent a single or multiple connections between client devices 114 and system 102 and/or network 110. In the illustrated example, client devices 114 are shown outside the system 102. In this case, the system 102 may be viewed as a support system that is supporting client devices 114, which are external to the system 102. In other cases, client devices 114 may be considered part of the system 102. As used herein, a user device 106 and/or a client device 114 may be a computer, laptop, mobile device, tablet, etc., and a server device 104 may be a network device that is configured to provide data and/or network services to the user device and/or client device. The server device may or may not be a producer, a point of generation and/or origination of the data. For instance, the data may originate elsewhere for the server device to be able to provide to the client device. Alternatively or additionally, the data may pass through other network devices (e.g., router, switch) on a path from the server device to the user device and/or client device.

FIGS. 1A-1E may be viewed as collectively illustrating an example use case scenario involving context preservation techniques. The example use case scenario may be a support session performed by at least one user of a user device 106 and a support agent 118. In general, a support agent may be a human or virtual agent. In the example scenario of FIGS. 1A-1E, support agent 118 may be viewed as a virtual agent, and instances of support agent 118 are embodied in the user devices 106 and at least one server device 104. In other examples, an instance of a support agent residing on a single device may be capable of performing a support session in accordance with context preservation techniques. The support session may be associated with a work unit (e.g., operational ticket, network ticket) identifying the support session. In this example, the user of user device 106 may have been assigned the operational ticket.

In the example scenario shown in FIGS. 1A-1E, the support session includes a conversation expressed among the instances of the support agent 116 on the server devices 104 and/or user devices 106. In order to illustrate the support session, FIGS. 1A-1E show example graphical user interfaces (GUIs) 116 presented via the displays 108 of user devices 106. As shown in FIG. 1A, for instance, GUI 120(1) presented on display 108(1) of user device 106(1) may include a conversational user interface 122. The conversational user interface 122 may feature examples of user text 124 and/or support text 126. GUIs 120 may also include an area 128 for examples of supplemental data 130, and/or may include various actions 132. Note that only one action, "load support session" is specifically designated in FIG. 1A to avoid clutter on the drawing page. In some cases, the actions 132 may be selectable and/or clickable buttons, for instance. The example GUIs 120 shown in FIGS. 1A-1E are not meant to be limiting. A wide variety of designs and/or features for any particular GUI are contemplated in accordance with context preservation techniques. For instance, although conversational user interface 122 is shown in FIGS. 1A-1E with sections divided between user text 124 and support text 126 (with a dashed line separating the sections), in other examples user text and support text may be presented in succession (e.g., stacked, interleaved, etc.) within a same section of an interface. Furthermore, any given GUI may include other features, such as headers, tabs, navigation buttons, etc.

In the example use case scenario illustrated in FIG. 1A, envision that a user of user device 106(1) is engaging a support agent 118(1) in accordance with an assigned operational ticket. For example, the user may be an engineer tasked with checking on service that is being provided to at least one of client devices 114. The engineer may wish to inquire about an operational status of the computing network 110, the client devices 114, the network connection 116, an overall status of the service being provided, etc. The status of the computing network 110 and/or the service being provided may be represented by various factors such as latencies, dropped packets, connectivity, etc., related to either the client devices 114, the server devices 104, and/or the network connection 116, for instance. The engineer may be seeking information that will help to debug an issue, such as poor performance experienced by a client device 114. In order to make an inquiry, the engineer may initiate a support session via the conversation user interface 122. As shown in FIG. 1A, the engineer may initiate the support session by entering user text 124(1), which may represent the inquiry. In this case, the user text 124(1) asks "How are we doing?"

The support agent 118 may respond to the user text 124(1) with support text 126(1), representing a response. In FIG. 1A, the support text 126(1) (e.g., response) is "This cluster is fine."

In some implementations, a user may be able to place a cursor 134 and type directly into the conversational user interface 122. In other implementations a GUI 120 may have a separate area for text entry. Additionally or alternatively, a user may also be able to enter user text 124 and/or an inquiry by making a selection from a list or pull-down menu, speaking into a microphone, etc. In the example scenario of FIGS. 1A-1E, the support agent 118 may be a chat bot. The chat bot may be enabled to translate and/or decode any instance of user text 124 (e.g., inquiry), and/or to prepare appropriate support text 126 (e.g., response). The chat bot may rely on preprogrammed responses, may use natural language processing to "read" the inquiry and/or "write" a response, and/or may learn responses from past conversations and/or support sessions. The chat bot may be located on user device 106(1), on at least one of server devices 104, or located on both. For example, the support agent 118(1) that is local on user device 106(1) may be enabled to respond to preprogrammed inquiries, but may forward other inquiries to the support agent 118(3) on a server device 104. The support agent 118(3) on the server device 104 may then prepare appropriate support text 126, and send the support text 126 back to user device 106(1) for display to the user via the conversational user interface 122.

In some examples, a virtual support agent 118 may be trained to respond to an inquiry by fetching relevant supporting information. For example, a support agent 118 may perform a search for supporting information based at least in part on the user text 124. In the example shown in FIG. 1A, support agent 118(1) (or support agent 118(3)) may prepare a search query based on the user text 124(1). The search query may result in identification of supplemental data 130(1), which may represent a general status for the client devices 114. The support agent 118(1) may cause the identified supplemental data 130(1) to be shown in area 128. As shown in FIG. 1A, supplemental data 130(1) is a graph with "time" on the x-axis and a percentage on the y-axis. In this case, the graph may depict percentages of client devices 114 experiencing acceptable performance characteristics (e.g., acceptable connectivity, latency, etc.) over time. The graph includes lines for client devices 114 that have wired and wireless network connections 116, and the graph includes a dotted line depicting an overall percentage for client devices 114 with both wired and wireless network connections 116 combined. Note that a support agent 118 may use additional information relevant to the support session to form a query for supplemental data 130. For example, although the user text 116(1) does not literally refer to client devices 114, the support agent 118(1) (or 188(3)) may have used additional information entered or selected via user device 106(1) to identify the client devices 114 as the likely target of the inquiry represented by user text 124(1). For instance, the user of user device 106(1) may have logged in to the support agent 118(1) specifically to engage in a support session related to a secure shell application (SSH app) utilized at client devices 114.

In accordance with context preservation concepts, the user of user device 106(1) may choose to save the support session. The support session may be saved at any point in the conversation. For example, the user may simply wish to preserve the support session out of caution, or to allow another user to participate in the support session, etc. Therefore, the user may move a cursor 134(1) over an action 132 to "save support session" as shown in FIG. 1A. Additionally or alternatively, the support session may be saved automatically by support agent 118(1). Any instance of a support agent 118 may function as a conversation tracker, saving a record of the support session. The conversation tracking feature may activate at the start of a support session. For example, the support session may be saved at regular or irregular time intervals, after each user text 124 and/or support text 126 instance, for each new supplemental data 130 display, upon occurrence of other triggers not related to visualizations, etc. More description regarding saving the support session will be described below relative to FIG. 1B.

Figure 1B:
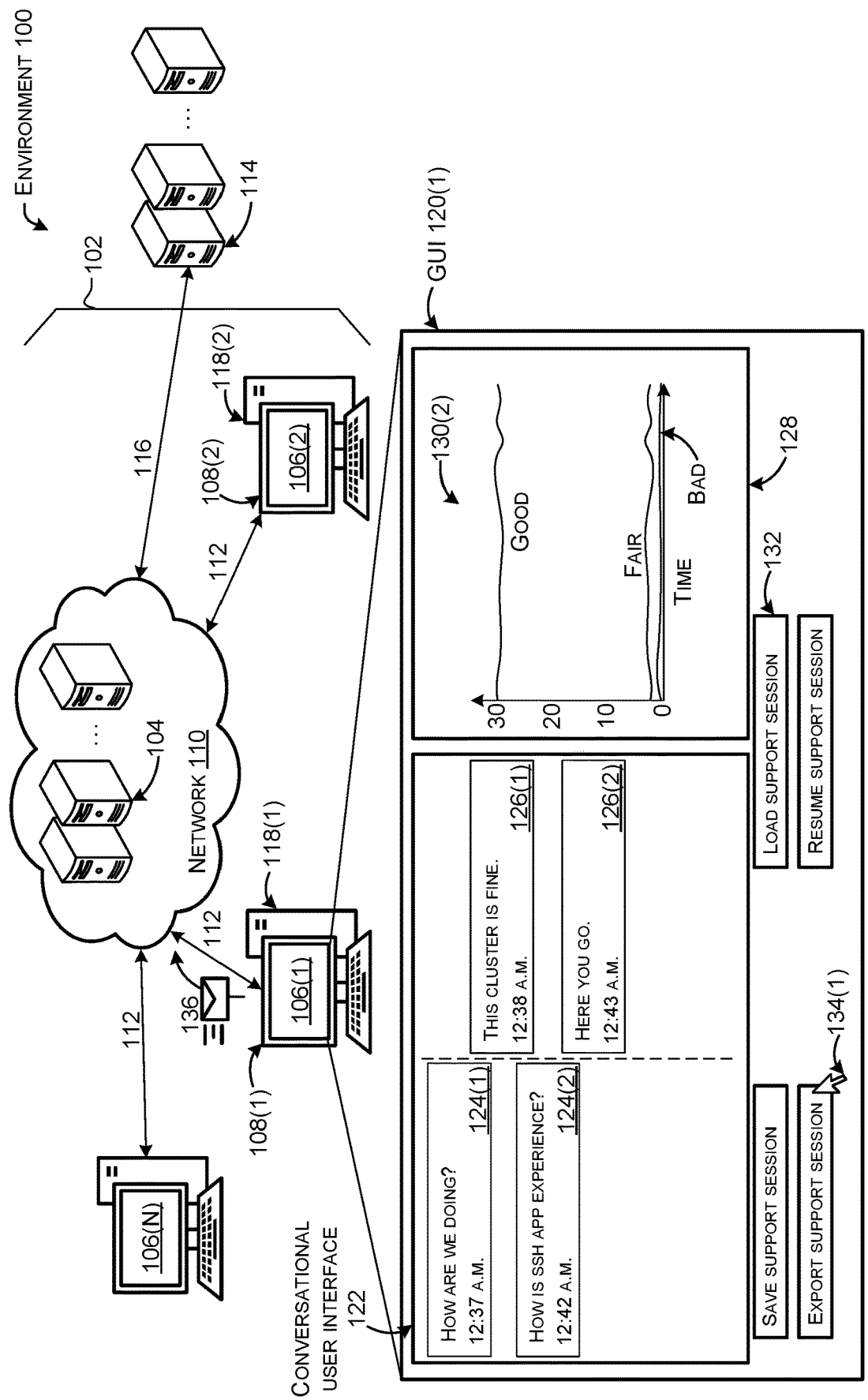

In FIG. 1B, the user of user device 106(1) continues to engage support agent 118(1) via the conversational user interface 122. In the example in FIG. 1B, the user has entered an additional instance of user text 124(2), or stated another way, the user has made an additional inquiry, "How is SSH app experience?" shown in the conversational user interface 122. Also in FIG. 1B, the support agent 118(1) has provided an additional instance of support text 126(2) in the conversational user interface 122, manifest as a response to the additional inquiry, "Here you go." Also, the support agent 118(1) has provided supplemental data 130(2) in area 128. Supplemental data 130(2) is a graph with "time" on the x-axis and numbers of client devices 114 on the y-axis. In this case, the numbers of client devices 114 may correspond to how many client devices 114 are experiencing "good," "fair," or "bad" performance characteristics over time.

As shown in FIG. 1A, support text 126(1) corresponds to supplemental data 130(1). As shown in FIG. 1B, support text 126(2) corresponds to supplemental data 130(2). In some implementations, context preservation concepts may include establishing and/or preserving a link between corresponding instances of support text 126 (and/or user text 124) and supplemental data 130. A timestamp associated with support text 126 and/or supplemental data 130 may be used to establish a link. For example, referring to FIG. 1A, support text 126(1) shows a corresponding timestamp of 12:38 A.M. The timestamp may represent a time (e.g., absolute time), or approximate time, that support agent 118(1) responded to the user text 124(1). The timestamp of support text 126(1) may also correspond to a time, or approximate time, that support agent 118(1) provided supplemental data 130(1). In some cases, a timestamp associated with support text 126 may be linked to a range of time during which supplemental data 130 may have been displayed. In FIGS. 1A-1E the timestamps are shown in the conversational user interface 122 for illustration purposes; in other examples, the timestamps may not necessarily be visible to a user. In some examples, the timestamps may be used to establish a sequence for the elements of the support session, which may then be preserved in discrete portions (described in greater detail below, relative to FIG. 2). Various other methods of linking instances of supplemental data 130 with elements of conversational user interface 122 are contemplated, including linking supplemental data 130 to user text 124 instances, or other aspects of the conversation, etc.

Referring again to FIG. 1B, a user of user device 106(1) may reach an endpoint of involvement with a given support session. For example, the user may not be able to determine a cause of a performance problem and may wish to refer the support session to a colleague. In another example, the user may find that the system under review appears to be performing adequately, and does not require continued review. In some cases, the user may come to an end of their allotted time to participate in a support session (e.g., end of a work shift). For a variety of reasons, a user may wish to end, suspend, or to simply exit a support session. However, the user may also wish to save or export the support session for another time, or another user.

As noted above, the support session may be saved automatically by the support agent 118, effectively tracking the conversation. One way to conceptualize the tracked conversation is a sequence of messages. In this example, each message may contain instances of user text 124, support text 126, supplemental data 130, timestamps, etc. Therefore, each message may contain a copy of relevant context pertaining to a text portion of the conversation, even as the conversation progresses and the context evolves. The conversation tracker function of a support agent may be backed and/or served by a storage engine. The storage engine may be a fast-caching storage engine, for instance. FIG. 2 provides an example message 200 pertaining to a particular portion of a conversation. In some implementations, the illustration in FIG. 2 may be considered an example underlying data structure for a tracked conversation. The example message 200 shown in FIG. 2 is for illustration purposes; the values shown in message 200 are representational. As such, FIG. 2 does not necessarily correspond to the use case scenario shown in FIGS. 1A-1E. Example message 200 includes numbered lines of text (1-27). Within the lines of text, lines 3-6 may correspond to an example of user text in a conversation. Lines 10-15, 19, and 20 may correspond to an example of supplemental data. Lines 17 and 18 may correspond to an example of support text. Therefore, in this example, the user may be asking a support agent (e.g., chat bot): "How was the network doing yesterday in San Jose?" The support agent may use natural language processing to consider the inquiry from the user, and respond with: "There were intermittent issues." The support agent may also provide context for the text response. In the case of example message 200, the context includes a line chart showing performance issues over October $22^{nd}$ and $23^{rd}$. Furthermore, as shown in lines 22 and 23 of message 200, the support agent may be able to provide a suggestion to the user for a subsequent inquiry. In this case, the support agent suggests: "which clients had bad health scores" to the user. The suggestion may be presented as a clickable option within a GUI on a user device, for instance.

Referring again to FIG. 1B, the support session may be saved as a data package 136. The data package 136 may be generated by the conversation tracker function of the support agent such that the data package 136 represents a full chat history of the support session. In some cases, the data package 136 may be generated by collecting saved messages (i.e., message 200) at the point that the support session is to be exported. Further, the data package 136 may be automatically attached to or reference an associated work unit (e.g., the assigned operational ticket). In some implementations, the data package 136 may be a downloadable, serialized representation of the tracked conversation (e.g., messages), user annotations, metadata such as a model version of the natural language processing, application version of the support agent, etc. The data package 136 may also include additional information or metadata, such as identifying information about the user, system information, network information, and/or information relating to any of client devices 114, network connections 112, network connection 116, server devices 104, and/or user devices 106. Aspects related to the order or timing of the conversation may also be included or inherent in the data package 136, such as timestamps, ranges of times, and/or links between support session elements. In general, potentially all necessary data relevant to the support session is contained in the data package 136, which may then be passed to another device without loss of contextual information. Note that the user need not participate in any decision process regarding which aspects of the support session to preserve. Rather, the support agent 118 may automatically preserve the support session in a standardized format with predetermined contents. The data package 136 may feature a file format specific to the support agent 118, such as a declarative syntax format. The data package 136 may be considered a self-contained representation of the support session, and may be restored via any instance of support agent 118, even a support agent 118 that is external to, remote from, and/or otherwise outside the system 102 and/or network 110.

As illustrated in FIG. 1B, the user of user device 106(1) may wish to export the support session (e.g., data package 136). Accordingly, the user may select "export support session" with the cursor 134(1). In response, data package 136 may be exported from user device 106(1) via link 112 to another device, such as a server device 104. Additionally or alternatively, context preservation concepts may include automatically exporting a support session, such as when a user disengages from the support session (e.g., closes the program or application, etc.). In some examples, a support session may be exported in response to a request from another device. For instance, a network administrator may request information regarding client devices 114, and the data package 136 may be identified and/or delivered in response to the request.

Figure 1C:
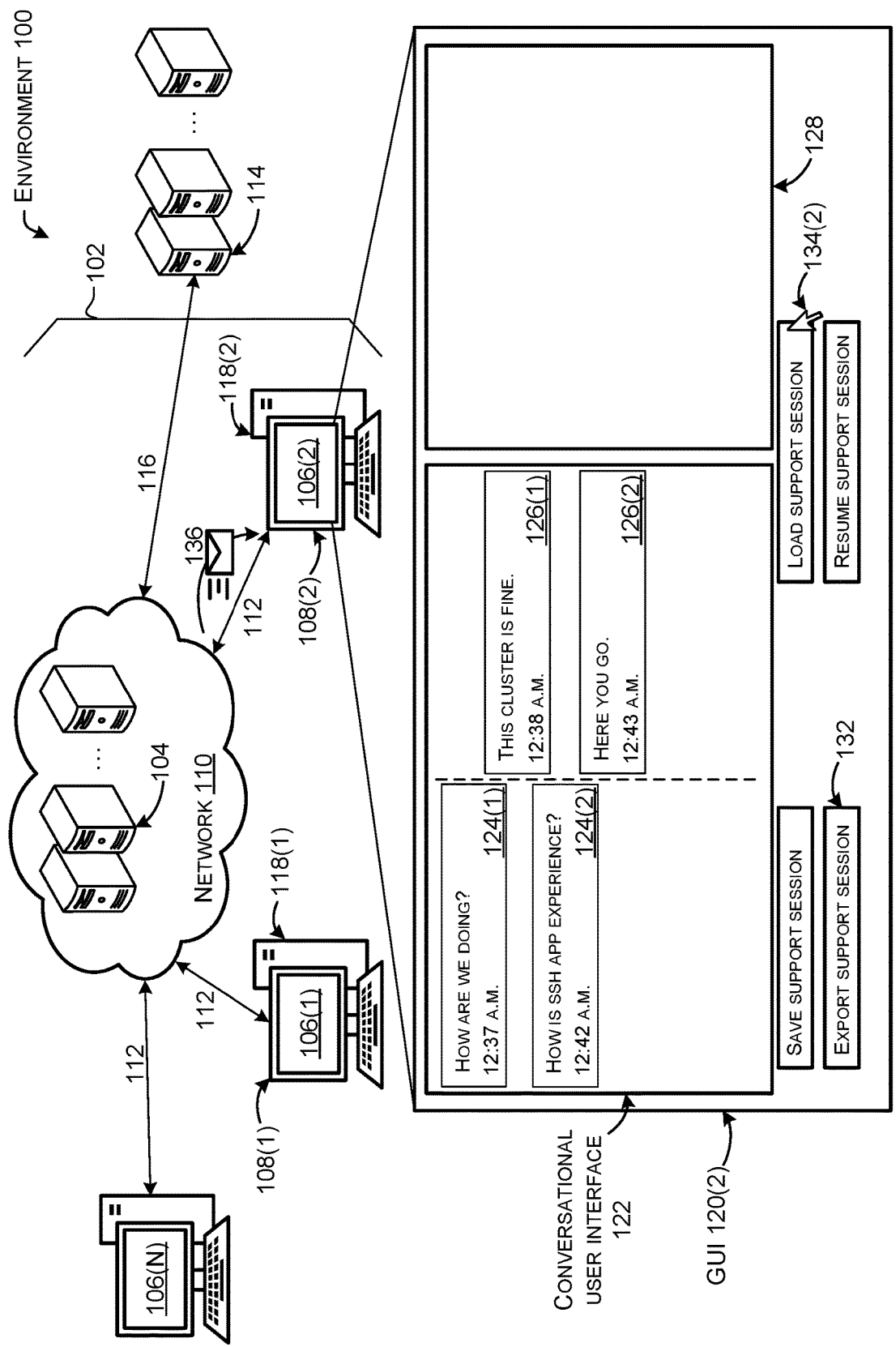

The example use case scenario continues with FIG. 1C. In this example, the data package 136 is sent from a server device 104 to user device 106(2). The operational ticket may have been reassigned to a user of user device 106(2), for instance. In FIG. 1C, a second GUI 120(2) is being shown on display 108(2) of user device 106(2). Shown within the GUI 120(2), the user of user device 106(2) has opened the conversational user interface 122 via support agent 118(2). Also, with cursor 134(2) the user has selected an action 132, "load support session," causing the data package 136 to be utilized. Therefore, the support session in which the user of user device 106(1) was previously participating is now displayed via the GUI 120(2) of display 108(2). In other examples, the user of user device 106(2) may select data package 136 from multiple available data packages (not shown), or may select the assigned operational ticket in some manner. Note that in FIG. 1C, the previously displayed (FIG. 1B) instances of user text 124 and support text 126 are again displayed in the conversational user interface 122; however, no instances of supplemental data 130 are displayed in area 128. Stated another way, the previous support session has been loaded, but no context for the conversation is being shown.

In some cases, the exported data package 136 may be loaded by any instance of a support agent 118 at any time. At the time that the support session is loaded, the support agent 118 may replay the entire conversation contained in the data package 136. Since each message representing a portion of the conversation contains the relevant context, the context is also restored as part of the replay process. In addition, any annotations and/or notes left by a previous user may be restored too. As a result, the new user (e.g., the user of user device 106(2)) can continue the conversation as if he/she was in the same original support session.

Figure 1D:
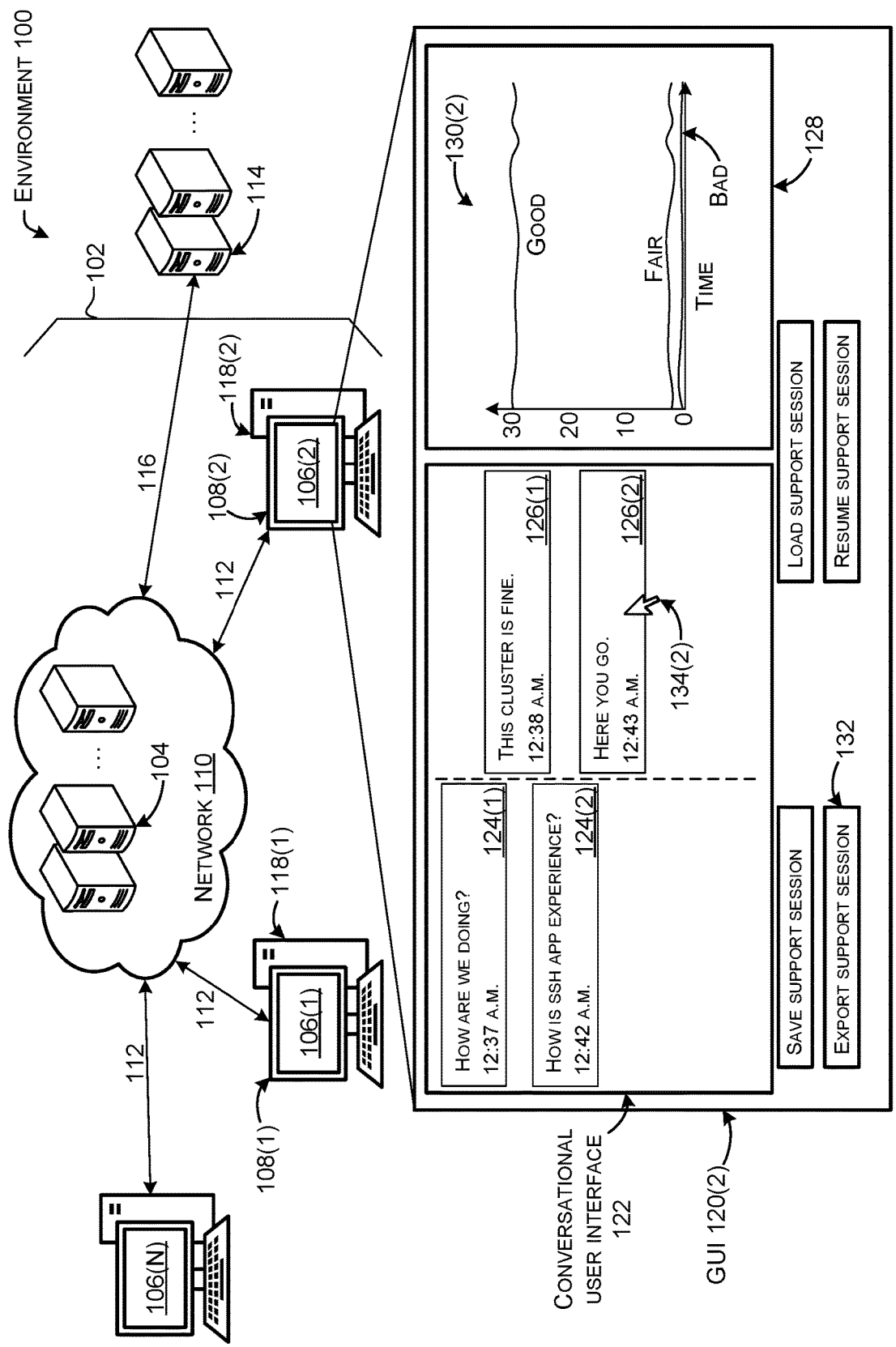
Figure 1E:
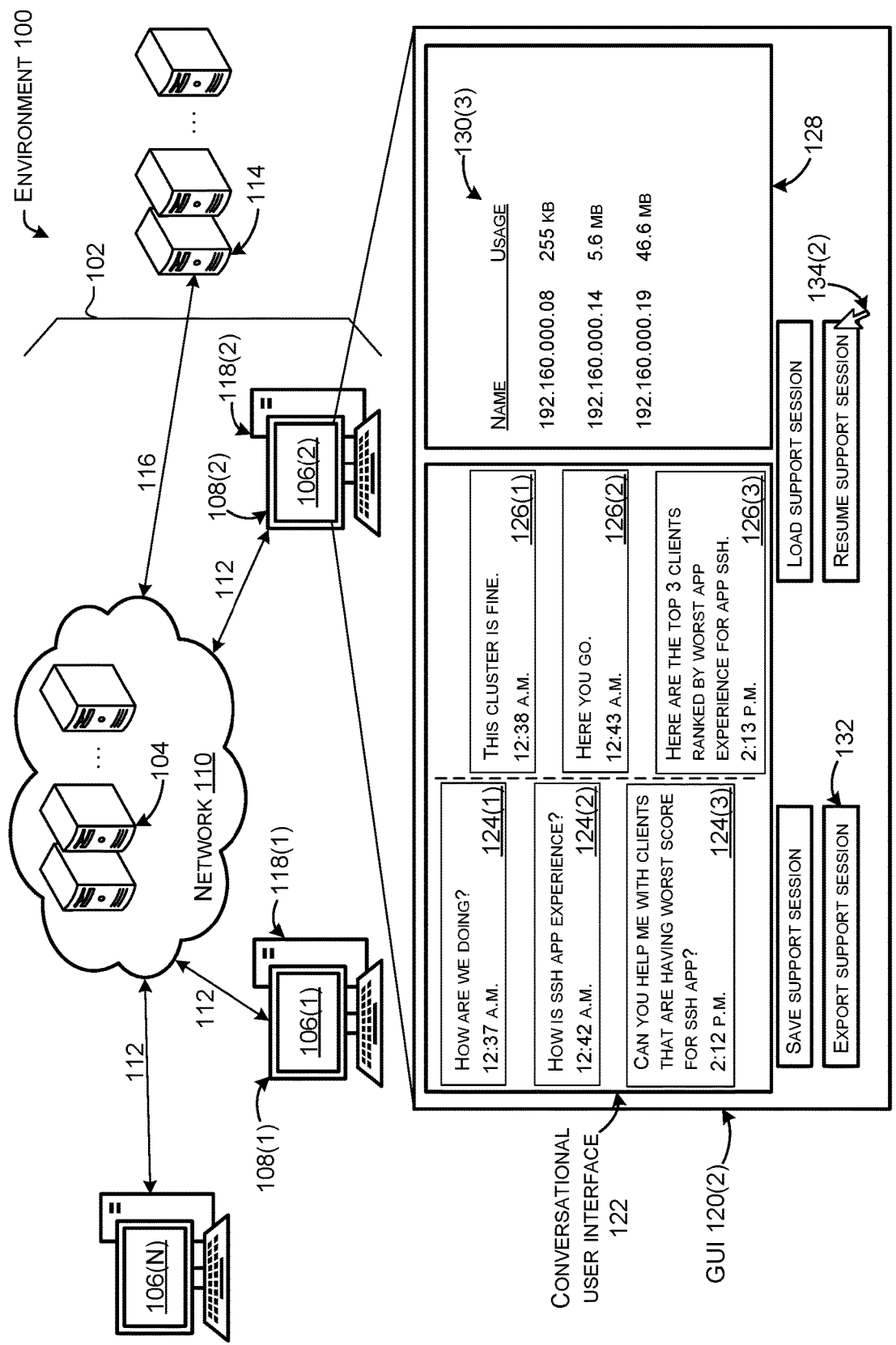

In some examples, a support agent 118 may allow a user to navigate through a restored support session. The user may be able to scroll through a conversation within the conversational user interface 122 of the support session, and may be able to view a context of the conversation at different timepoints, for instance. Referring to FIG. 1D, the user of user device 106(2) may be able to scroll through the conversation shown in conversation user interface 122. In this case, the user of user device 106(2) may be reviewing the conversation between the user of user device 106(1) and the support agent 118(1). In order to learn more about a particular portion of the conversation, the user of user device 106(2) may wish to see the context of that particular portion. As shown in FIG. 1D, the user of user device 106(2) may select support text 126(2) with cursor 134(2) (the user may select user text 124(2) in other instances, etc.). In response, support agent 118(2) causes supplemental data 130(2) to be displayed in area 128. Thus, the user of user device 106(2) is able to view the context of the conversation at the particular portion that includes support text 126(2). Since a link between support text 126(2) and supplemental data 130(2) was included in data package 136 (e.g., support text 126(2) and supplemental data 130(2) were contained in a single message), support agent 118(2) is able to respond to the selection of support text 126(2) with the appropriate context, supplemental data 130(2) in this instance. Other techniques for providing corresponding context are contemplated. For example, successive instances of corresponding supplemental data 130 may be displayed in area 128 responsive to scrolling through the conversation in the conversational user interface 122, without a user necessarily selecting a particular portion of the conversation. In another example, the corresponding supplemental data 130 may be displayed in area 128 responsive to a user hovering a cursor 134 over the particular portion of the conversation, without clicking on an item of text, etc.

As described above, via data package 136 the user of user device 106(2) has access to a fully interactive, rich experience of the support session in which the user at user device 106(1) participated. Furthermore, in addition to browsing the chat history, the user at user device 106(2) may choose to resume the support session. Illustrated in FIG. 1E, the user of user device 106(2) has selected the action 132 "resume support session" with cursor 134(2). The user has entered a new instance of user text 124(3), and support agent 118(2) has replied with a new instance of support text 126(3). Additionally, support agent 118(2) has provided a new instance of supplemental data 130(3) in area 128. In this case, supplemental data 130(3) is a chart corresponding to the support text 126(3). The chart provides context for the particular portion of the conversation that includes user text 124(3) and support text 126(3). The timestamps associated with the support session may be derived from absolute time, therefore the support session may be time-consistent between instances of the support session at user device 106(1) and user device 106(2). Referring again to FIG. 1E, the support session active on user device 106(2) may again be saved and/or exported. For instance, data package 136 may be updated to include the new material, such as user text 124(3), support text 126(3), supplemental data 130(3), additional information relevant to user device 106(2), etc. In other examples, a new data package may be prepared to record the support session.

In summary, context preservation techniques may be viewed as context-aware time travel for a conversation, providing a fully integrated and frictionless experience between multiple users for a continuous user session (e.g., support session). In contrast to solution that require a user to share information in the form of screenshots and captions, context preservation concepts enable sharing in the form of a self-contained bundle that retains rich information about the user session. The entire chat history is shared along with critical conversation context for each message, including interactive widgets, etc. Context preservation techniques offer seamless conversation recording and export, while keeping pace with updated conversational user interfaces and/or chat bots. A new user is therefore able to efficiently review conversation points or actions taken by a previous user, without having to reconstruct or redo the work. In this manner, retracing steps, delayed problem resolutions, and/or wasted resources may be avoided.

Figure 3:
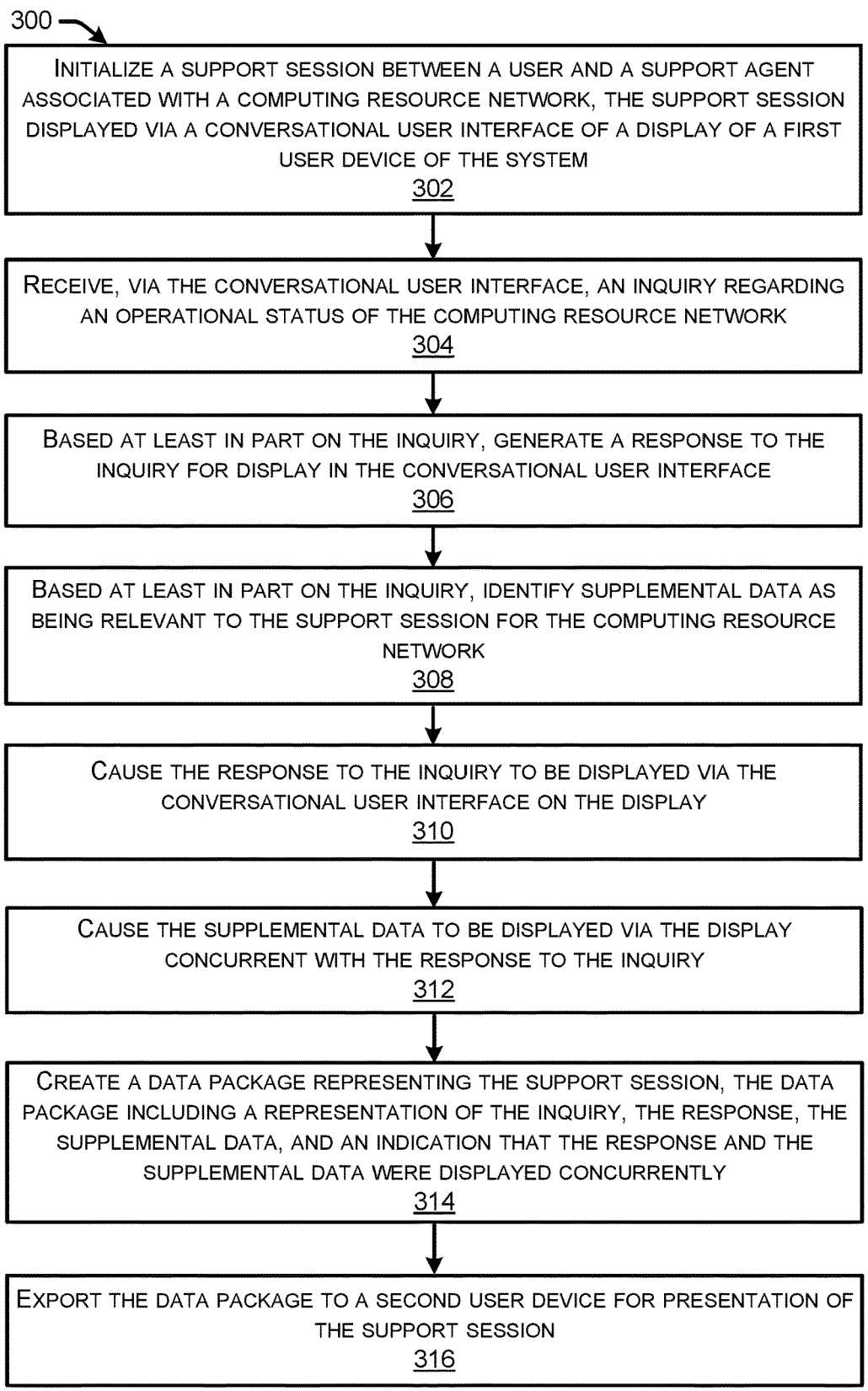
FIGS. 3 and 4 illustrate flow diagrams of example methods for performing context preservation techniques, in accordance with the present concepts.
Figure 4:
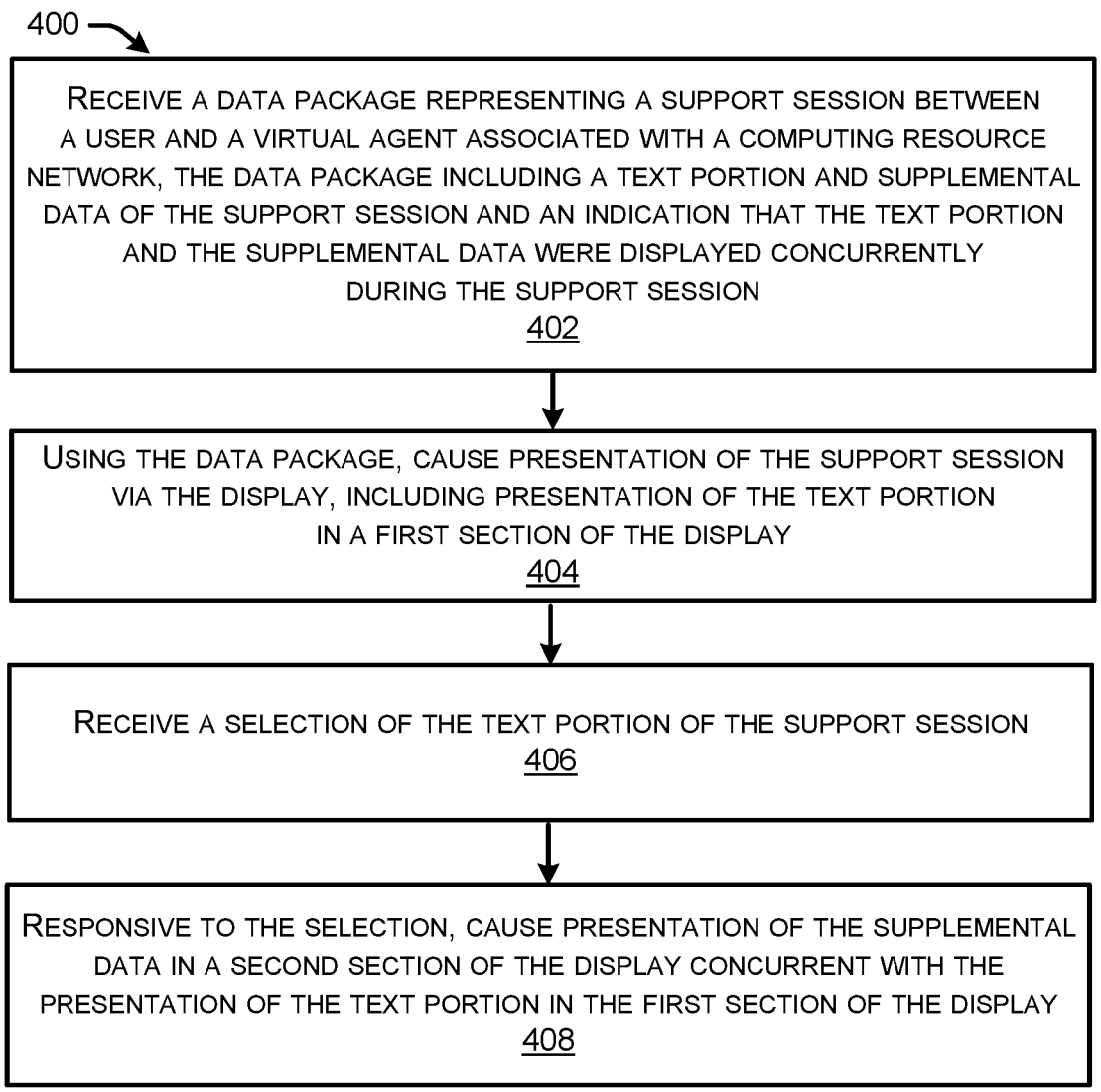

FIGS. 3 and 4 illustrate flow diagrams of example methods 300 and 400 that include functions that may be performed at least partly by a user device and/or a server device, such as user device 106 or server device 104 described relative to FIGS. 1A-1E. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 3 illustrates a flow diagram of an example method 300 for performing context preservation techniques. Method 300 may be performed by a server device (e.g., server device 104) communicatively coupled to a first and second user devices (e.g., user devices 106), for instance. Additionally or alternatively, method 300 may be performed by a user device (e.g., user devices 106). In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include initializing a support session between a user and a support agent associated with a computing resource network, the support session displayed via a conversational user interface of a display of a first user device of the system.

At 304, method 300 may include receiving, via the conversational user interface, an inquiry regarding an operational status of the computing resource network.

At 306, based at least in part on the inquiry, method 300 may include generating a response to the inquiry for display in the conversational user interface. In some examples, generating the response to the inquiry may be based at least in part on applying natural language processing to the inquiry.

At 308, based at least in part on the inquiry, method 300 may include identifying supplemental data as being relevant to the support session for the computing resource network.

At 310, method 300 may include causing the response to the inquiry to be displayed via the conversational user interface on the display;

At 312, method 300 may include causing the supplemental data to be displayed via the display concurrent with the response to the inquiry. In some examples, the supplemental data may comprise a diagram, a chart, and/or a list. A variety of types and/or forms of supplemental data are contemplated.

At 314, method 300 may include creating a data package representing the support session, the data package including a representation of the inquiry, the response, the supplemental data, and an indication that the response and the supplemental data were displayed concurrently. In some examples, the indication that the response and the supplemental data were displayed concurrently may comprise a first timestamp corresponding to display of the response and a second timestamp corresponding to display of the supplemental data. Furthermore, the indication may comprise the first timestamp and the second timestamp being within a range of time. For instance, the indication that the response and the supplemental data were displayed concurrently may comprise a first range of time of display of the response and a second range of time of display of the supplemental data, and the first range and the second range may at least partly overlap.

At 316, method 300 may include exporting the data package to a second user device for presentation of the support session. In some examples, method 300 may further include causing the support session to be displayed via another display of the second user device. Method 300 may further include receiving a selection of the response to the inquiry via the second user device. At least partly in response to the selection, method 300 may include displaying the supplemental data concurrently with the response on a second display of the second user device.

FIG. 4 illustrates a flow diagram of an example method 400 for performing context preservation techniques. Method 400 may be performed by a user device (e.g., user device 106), for instance, or by a server device (e.g., server device 104) that is separate from user devices. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving a data package representing a support session between a user and a virtual agent associated with a computing network, the data package including a text portion and supplemental data of the support session and an indication that the text portion and the supplemental data were displayed concurrently during the support session.

At 404, using the data package, method 400 may include causing presentation of the support session via a display, including presentation of the text portion in a first section of the display. In some cases, the first section of the display may comprise a conversational user interface. Method 400 may further include receiving an indication from another user to resume the support session. Responsive to the indication, method 400 may include resuming the support session by activating the conversational user interface.

At 406, method 400 may include receiving a selection of the text portion of the support session.

At 408, responsive to the selection, method 400 may include causing presentation of the supplemental data in a second section of the display concurrent with the presentation of the text portion in the first section of the display. In some examples, method 400 may further include receiving, via the activated conversational user interface, an inquiry regarding an operational status of the computing network. Based at least in part on the inquiry, method 400 may include generating a response to the inquiry for display in the conversational user interface. In some instances, the response to the inquiry may be based on the text portion of the support session. Further, method 400 may include causing the response to the inquiry to be displayed via the conversational user interface on the display. In some implementations, method 400 may also include generating an updated data package representing the resumed support session. The updated data package may include the indication of supplemental data that were displayed concurrently with the text portion of the support session, the inquiry, and the response. Method 400 may also include exporting the updated data package to another computing device.

Figure 5:
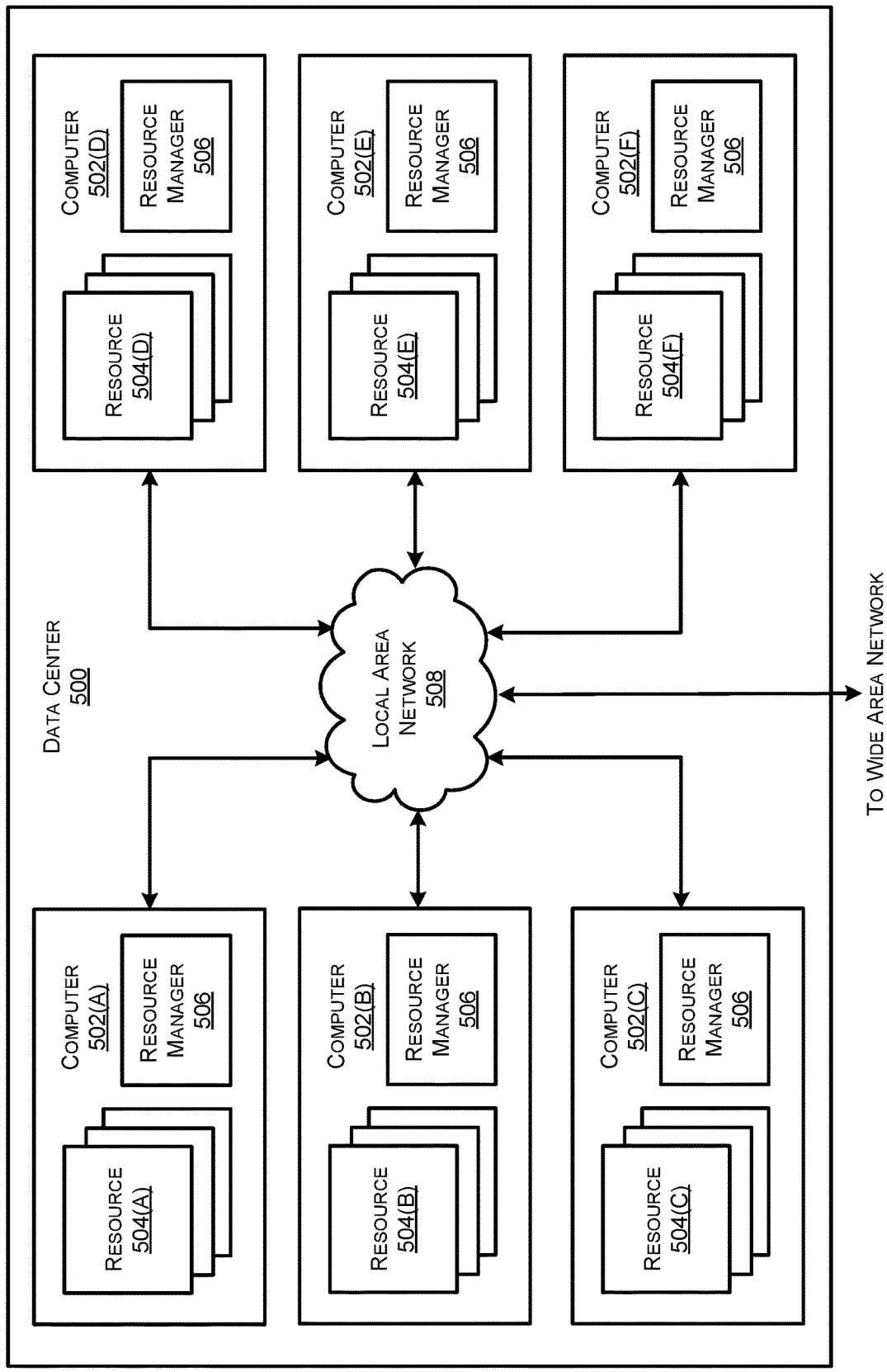
FIG. 5 illustrates a computing system diagram illustrating a configuration for a data center that can be utilized to implement aspects of the technologies disclosed herein.

FIG. 5 is a computing system diagram illustrating a configuration for a data center 600 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the resources and/or computers 502 may include, or correspond to, any type of networked device described herein, such as a server device 104, user device 106, and/or client device 114. Although, computers 502 may comprise any type of networked device, such as servers, switches, routers, hubs, bridges, gateways, modems, repeaters, access points, hosts, etc.

The computers 502 can be standard tower, rack-mount, or blade server computers configured appropriately for providing computing resources. In some examples, the computers 502 may provide computing resources 504 including data processing resources such as virtual machine (VM) instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502. Computers 502 in the data center 500 can also be configured to provide network services and other types of services.

In the example data center 500 shown in FIG. 5, an appropriate local area network (LAN) 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein. For instance, the containers and/or virtual machines may serve as server devices, user devices, and/or routers in the computing network 110.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
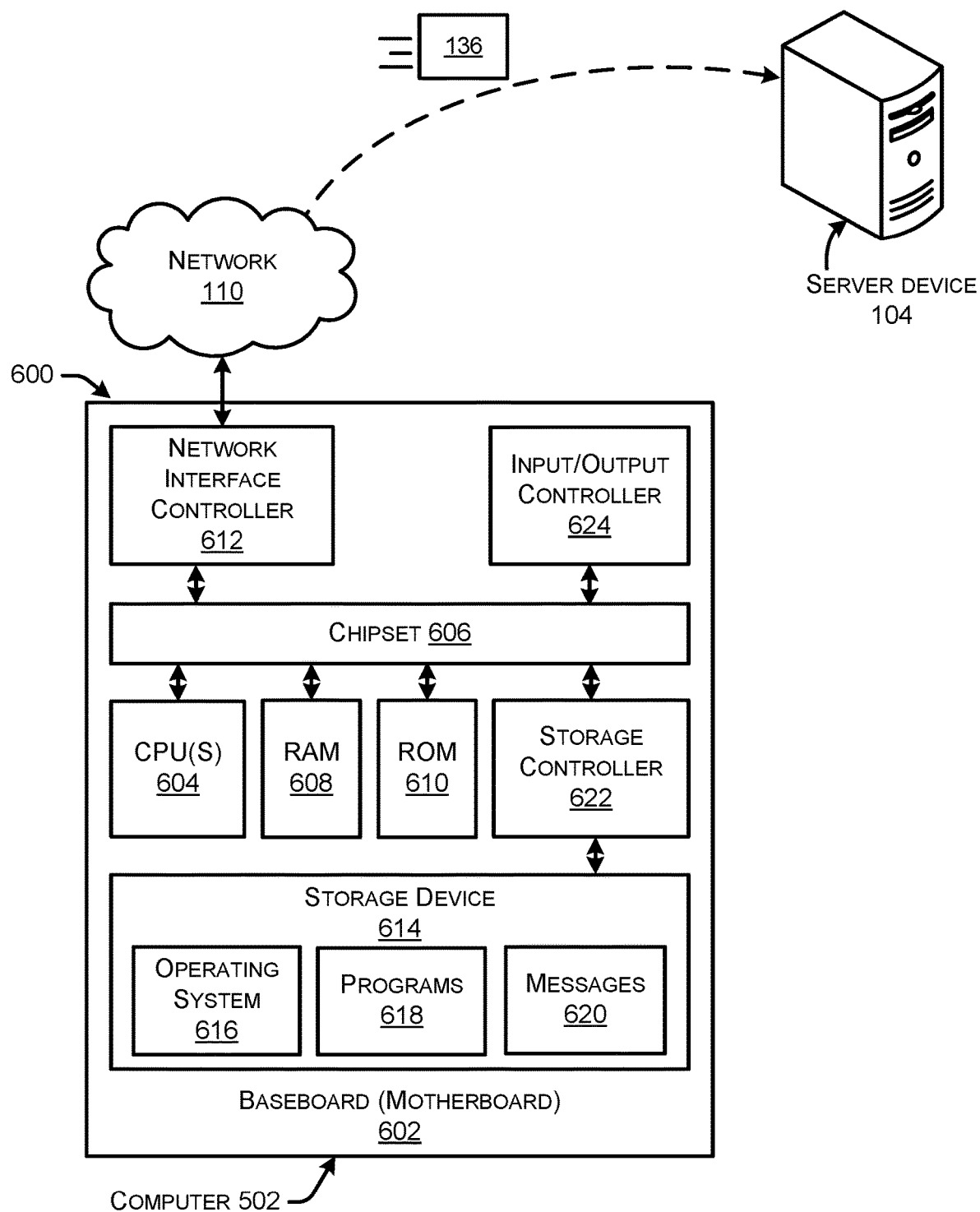
FIG. 6 is a computer architecture diagram showing an illustrative computer hardware architecture for implementing a device that can be utilized to implement aspects of the various technologies presented herein.

FIG. 6 shows an example computer architecture 600 for a computer 502 capable of executing program components for implementing the functionality described above. The computer architecture 600 shown in FIG. 6 illustrates a conventional server computer, workstation, desktop computer, laptop, tablet, network appliance, e-reader, smartphone, and/or other computing device, and can be utilized to execute any of the software components presented herein. The computer 502 may, in some examples, correspond to a physical device described herein (e.g., server device, user device, router, etc.), and may comprise networked devices such as servers, switches, routers, hubs, bridges, gateways, modems, repeaters, access points, etc. For instance, computer 502 may correspond to a server device 104.

As shown in FIG. 6, the computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as the computing networks 110 and/or 508. The chipset 606 can include functionality for providing network connectivity through a network interface controller (NIC) 612, such as a gigabit Ethernet adapter. The NIC 612 is capable of connecting the computer 502 to other computing devices over the network 110. For instance, in the example shown in FIG. 6, NIC 612 may help facilitate transfer of data, packets, and/or communications, such as data package 136, over the network 110 with a server device 104. It should be appreciated that multiple NICs 612 can be present in the computer 502, connecting the computer to other types of networks and remote computer systems.

The computer 502 can be connected to a storage device 614 that provides non-volatile storage for the computer. The storage device 614 can store an operating system 616, programs 618 (e.g., support agent 118), messages 620 (e.g., message 200), and/or other data. The storage device 614 can be connected to the computer 502 through a storage controller 622 connected to the chipset 606, for example. The storage device 614 can consist of one or more physical storage units. The storage controller 622 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 614 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 614 is characterized as primary or secondary storage, and the like.

For example, the computer 502 can store information to the storage device 614 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 614 by detecting the physical states or characteristics of one or more particular locations within the physical storage units.

In addition to the mass storage device 614 described above, the computer 502 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 502. In some examples, the operations performed by the network 110, and or any components included therein, may be supported by one or more devices similar to computer 502. Stated otherwise, some or all of the operations performed by the network 110, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 614 can store an operating system 616 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 614 can store other system or application programs and data utilized by the computer 502.

In one embodiment, the storage device 614 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 402 has access to computer-readable storage media storing computer-executable instructions which, when executed by the computer 502, perform the various processes described above with regard to FIGS. 1A-4. The computer 502 can also include computer-readable storage media having instructions stored thereupon for performing any of the other computer-implemented operations described herein.

The computer 502 can also include one or more input/output controllers 624 for receiving and processing input from a number of input devices, such as a keyboard, a mouse, a touchpad, a touch screen, an electronic stylus, or other type of input device. Similarly, an input/output controller 624 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise one or more devices, such as server devices 104, user devices 106, client devices 114, and/or other devices. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by server device 104 and user devices 106, and/or other devices. In some examples, the communications may include data, packet, request, acknowledgment, reusable NACK, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 618 may comprise any type of programs or processes to perform the techniques described in this disclosure in accordance with context preservation techniques. For instance, the programs 618 may cause the computer 502 to perform techniques for communicating with other devices using any type of protocol or standard usable for determining connectivity. Additionally, the programs 618 may comprise instructions that cause the computer 502 to perform the specific techniques for preservation of conversations and/or relevant context.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to:
initialize a support session between a user and a support agent associated with a computing network, the support session displayed via a conversational user interface of a display of a first user device;
receive, via the conversational user interface, an inquiry regarding an operational status of the computing network, the operational status related to a performance characteristic associated with one or more client devices serviced by the computing network;
based at least in part on the inquiry, generate a response to the inquiry for display in the conversational user interface;
based at least in part on the inquiry, identify supplemental data as being relevant to the support session, the supplemental data regarding the operational status of the computing network;
cause the response to the inquiry to be displayed via the conversational user interface on the display;
cause the supplemental data, including the performance characteristic, to be displayed via the display concurrent with the response to the inquiry;
create a data package representing the support session, the data package including a representation of the inquiry, the response, the performance characteristic, and an indication that the response and the performance characteristic were displayed concurrently; and
export the data package to a second user device for presentation of the support session.

2. The system of claim 1, wherein the indication that the response and the performance characteristic were displayed concurrently comprises a first timestamp corresponding to display of the response and a second timestamp corresponding to display of the performance characteristic.

3. The system of claim 2, wherein the indication further comprises the first timestamp and the second timestamp being within a range of time.

4. The system of claim 1, wherein the indication that the response and the performance characteristic were displayed concurrently comprises a first range of time of display of the response and a second range of time of display of the performance characteristic, and wherein the first range and the second range at least partly overlap.

5. The system of claim 1, wherein the first user device of the system includes the one or more processors.

6. The system of claim 5, wherein the computer-executable instructions further cause the one or more processors to:
receive a selection of the response to the inquiry via the second user device; and
at least partly in response to the selection, display the performance characteristic concurrently with the response on a second display of the second user device.

7. The system of claim 1, wherein the one or more processors are manifest in a server device of the system that is separate from the first user device and the second user device.

8. The system of claim 1, wherein the supplemental data comprises a diagram, a chart, or a list depicting the performance characteristic associated with the one or more client devices serviced by the computing network.

9. A method comprising:
initializing a support session between a user and a support agent associated with a computing network, the support session displayed via a conversational user interface of a display of a first user device;
receiving, via the conversational user interface, an inquiry regarding an operational status of the computing network, the operational status related to a performance characteristic associated with one or more client devices serviced by the computing network;
based at least in part on the inquiry, generating a response to the inquiry for display in the conversational user interface;
based at least in part on the inquiry, identifying supplemental data as being relevant to the support session, the supplemental data regarding the operational status of the computing network;
causing the response to the inquiry to be displayed via the conversational user interface on the display;
causing the supplemental data, including a representation of the operational status of the computing network, to be displayed via the display concurrent with the response to the inquiry;
creating a data package representing the support session, the data package including the inquiry, the response, the supplemental data, and an indication that the response and the supplemental data were displayed concurrently; and
exporting the data package to a second user device for presentation of the support session.

10. The method of claim 9, wherein the method is performed by a server device that is separate from the first user device and the second user device.

11. The method of claim 9, further comprising:
causing the support session to be displayed via another display of the second user device.

12. The method of claim 11, further comprising:
receiving a selection of the response to the inquiry via the second user device; and
at least partly in response to the selection, displaying the supplemental data concurrently with the response on the another display.

13. The method of claim 9, wherein the generating the response to the inquiry is based at least in part on applying natural language processing to the inquiry.

14. The method of claim 9, wherein the supplemental data comprises a diagram, a chart, or a list depicting the performance characteristic associated with the one or more client devices serviced by the computing network.

15. A computing device comprising:
one or more processors;
a display; and
one or more non-transitory computer-readable media storing computer-executable instructions that, when executed by the one or more processors, cause the one or more processors to:
receive a data package representing a support session between a user and a virtual agent associated with a computing network, the data package including a text portion and supplemental data of the support session and an indication that the text portion and the supplemental data were displayed concurrently during the support session, the supplemental data including a representation of a performance characteristic associated with at least one client device using the computing network;
using the data package, cause presentation of the support session via the display, including presentation of the text portion in a first section of the display;
receive a selection of the text portion of the support session; and
responsive to the selection, cause presentation of the supplemental data including the representation of the performance characteristic in a second section of the display concurrent with the presentation of the text portion in the first section of the display.

16. The computing device of claim 15, wherein the first section of the display comprises a conversational user interface, and wherein the computer-executable instructions further cause the one or more processors to:
receive an indication from another user to resume the support session; and
responsive to the indication, resume the support session by activating the conversational user interface.

17. The computing device of claim 16, wherein the computer-executable instructions further cause the one or more processors to:
receive, via the activated conversational user interface, an inquiry regarding an operational status of the computing network;
based at least in part on the inquiry, generate a response to the inquiry for display in the conversational user interface; and
cause the response to the inquiry to be displayed via the conversational user interface on the display.

18. The computing device of claim 17, wherein the computer-executable instructions further cause the one or more processors to:
generate an updated data package representing the resumed support session, the updated data package including the indication that the text portion and the supplemental data were displayed concurrently during the support session, the inquiry, and the response; and
export the updated data package to another computing device.

19. The computing device of claim 17, wherein the response to the inquiry is further based on the text portion of the support session.

20. The computing device of claim 15, wherein the representation of the performance characteristic comprises a diagram, a chart, or a list.

\* \* \* \* \*